United States Patent [19]

Ryan

[11] Patent Number: 4,744,580

[45] Date of Patent: May 17, 1988

[54] TOW HITCH FOR A TRACTOR

[76] Inventor: Charles C. Ryan, Rte. 2, Box 96, Elizabethtown, Ill. 62931

[21] Appl. No.: 28,461

[22] Filed: Mar. 20, 1987

[51] Int. Cl.⁴ .............................................. B60D 1/14
[52] U.S. Cl. ...................................... 280/411 A; 56/6
[58] Field of Search ........... 280/411 R, 411 A, 411 C, 280/412, 413, 415 R, 415 A; 56/6

[56] References Cited

U.S. PATENT DOCUMENTS

| 1,535,523 | 4/1925 | Escandon | 280/412 X |
| 1,582,947 | 5/1926 | Wagner et al. | 280/412 |
| 3,514,126 | 5/1970 | Fuss | 280/411 A |
| 4,063,748 | 12/1977 | Schmidt | 280/411 C |
| 4,123,082 | 10/1978 | Conner | 280/412 |
| 4,637,625 | 1/1987 | Blackwell | 280/412 |

*Primary Examiner*—John A. Pekar
*Attorney, Agent, or Firm*—Marshall, O'Toole, Gerstein, Murray & Bicknell

[57] ABSTRACT

A tow hitch for use with a tractor having, for example, a towing attachment, and one or more lawn or garden implements. The tractor may be, for example, a riding mower or other type of tractor, and the implement may be, for example, a rotary mower, a lawn dethatcher, a sweeper, a roller, etc., or combinations of such implements may be attached to the tow hitch. The tow hitch comprises a tow bar which extends transversely of the direction of movement of the tractor, and a tow bar receptacle which is attached to the tow bar and to the towing attachment of the tractor, the attachments being such that the tow bar does not pivot relative to the tractor. A bracket is secured to the forward side of each implement, and a flexible connector attaches the tow bar to the bracket.

12 Claims, 2 Drawing Sheets

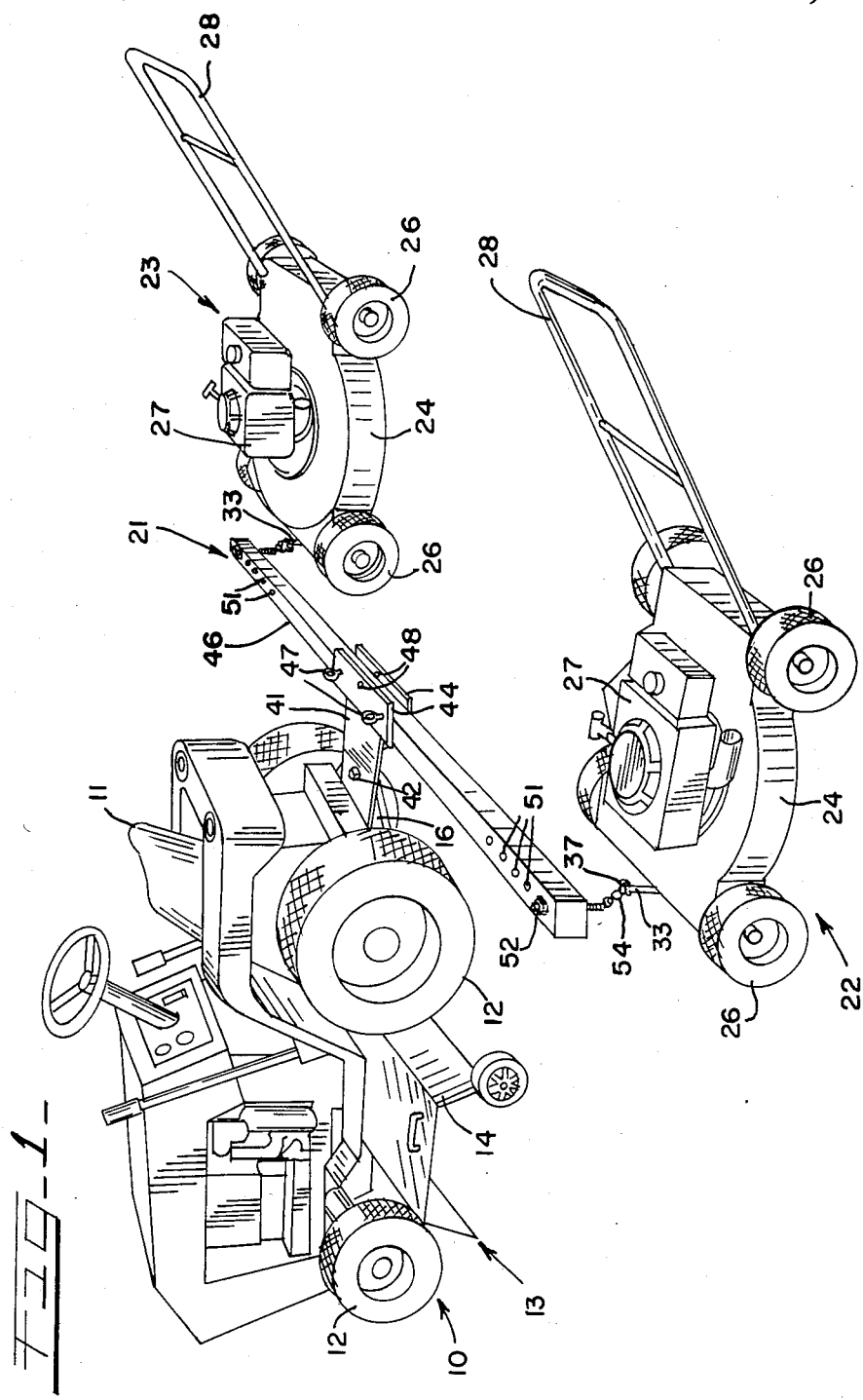

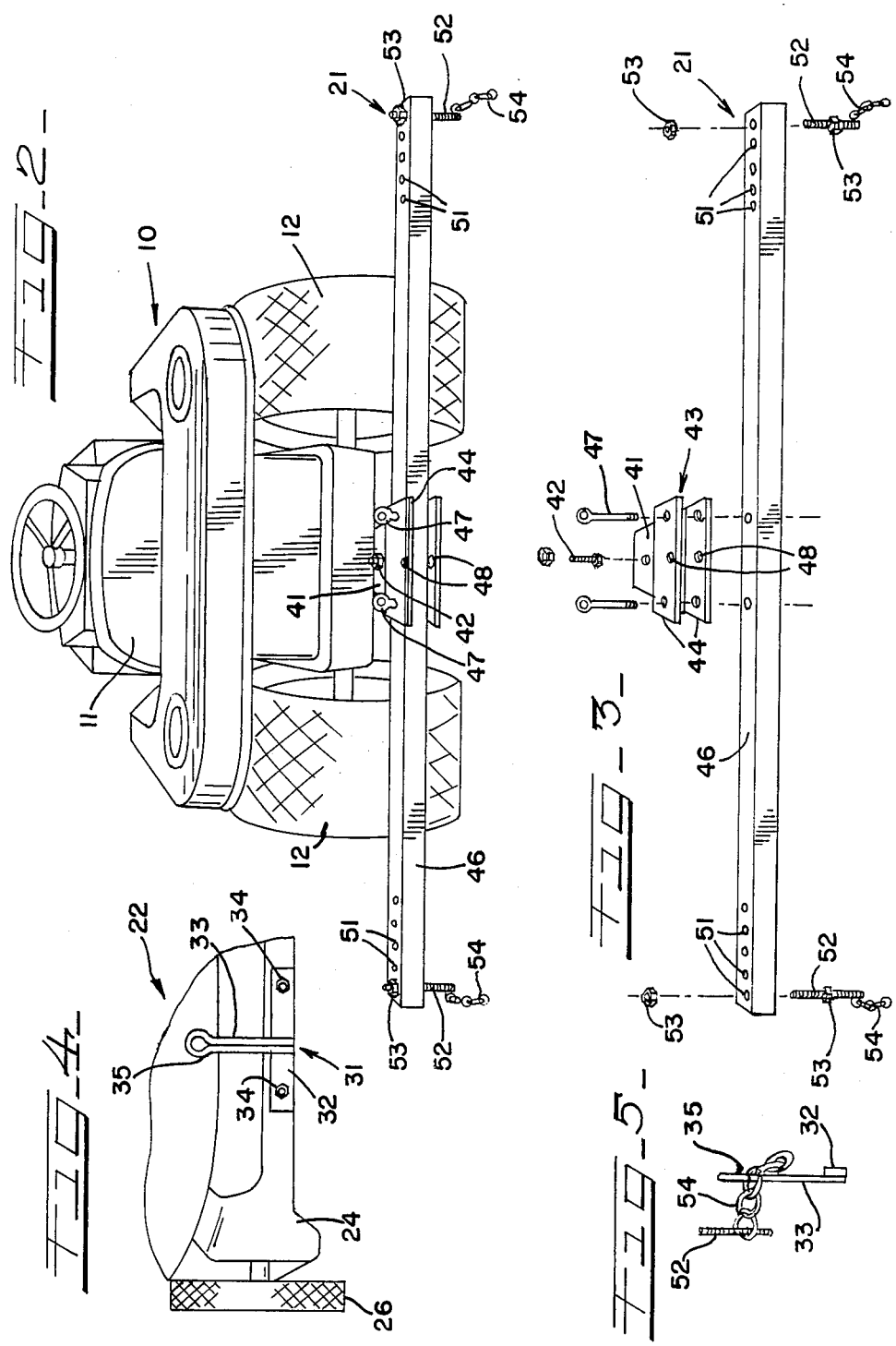

TOW HITCH FOR A TRACTOR

FIELD AND BACKGROUND OF THE INVENTION

This invention relates to a hitch for connecting a tractor to one or more lawn or garden implements.

A variety of powered garden and lawn care implements have been marketed and in general use for many years, powered lawn mowers probably being the best known. For small or average size lawns, a walk-behind rotary mower is commonly used; for larger lawns, a tractor or riding mower is preferable. For extra large lawns, arrangements have also been provided for cutting a wider swath than is possible with a riding mower.

For example, the Dunn U.S. Pat. No. 3,135,079 shows a mowing assembly for towing or pushing a number of mowing units. The units (which appear to be specially designed for this use in this assembly) are pivotably connected to a tow frame and the tow frame is either pivotably or non pivotably connected to a tractor.

The Averett U.S. Pat. No. 3,757,500 shows a tow frame for connecting two mowing units to a riding mower. It appears that push mowers are modified to such an extent that they become essentially permanent parts of the tow frame. Each unit is rigid with the tow frame, and the frame is pivotably connected to the riding mower.

The Kovacs U.S. Pat. No. 3,832,834 shows a hitch which is pivotably connected to a riding mower, and two push mowers are rigidly attached to the hitch. The customary front wheels of the push mowers are removed and replaced by swivel casters.

The prior art arrangements shown in the above three patents are relatively complex and expensive to manufacture. Even though the Kovacs patent states that the push mowers may be used independently of the tow frame, they do not appear to be easily disconnected from the tow frame, and the swivel casters would appear to make control difficult if a push mower of this character were used independently of the towing apparatus. Thus, there remains a need for an inexpensive and easily assembled or disassembled arrangement for towing one or more lawn or garden implements.

SUMMARY OF THE INVENTION

A tow hitch in accordance with this invention is for use with a tractor having, for example, a towing attachment, and one or more lawn or garden implements. The tractor may be, for example, a riding mower or other type of tractor, and the implement may be, for example, a rotary mower, a lawn dethatcher, a sweeper, a roller, etc., or combinations of such implements may be attached to the tow hitch.

The tow hitch comprises a tow bar which extends transversely of the direction of movement of the tractor, and a tow bar receptacle which is attached to the tow bar and to the towing attachment of the tractor, the attachments being such that the tow bar does not pivot relative to the tractor. A bracket is secured to the forward side of each implement, and a flexible connector attaches the tow bar to the bracket.

BRIEF DESCRIPTION OF THE DRAWINGS

The foregoing and other objects of the present invention will become more apparent from the following detailed description taken in conjunction with the accompanying figures of the drawings, wherein:

FIG. 1 is a perspective view of an assembly of parts including a hitch in accordance with the present invention;

FIG. 2 is a perspective view of a part of the assembly, and further illustrates the hitch;

FIG. 3 is an exploded perspective view of a part of the hitch;

FIG. 4 is a view showing another part of the hitch; and

FIG. 5 is another view showing a part of the hitch.

DETAILED DESCRIPTION OF THE DRAWINGS

While a hitch in accordance with the present invention is particularly useful in connection with a riding mower and push-type mowers, it should be understood that it may also be used with other types of towing tractors and other implements for the lawn and garden, such as dethatchers, rollers, sweepers, etc. Further, a combination of different types of implements may be used at one time with a tractor or riding mower.

FIGS. 1 and 2 show a riding mower 10 of the type including a wheeled vehicle that supports a seat 11 for a rider or operator. The riding mower further includes the customary wheels 12 and a rotary mower 13 which is mounted on the underside of the frame of the mower and between the wheels 12. A discharge chute 14 for mower clippings is shown in FIG. 1 and forms part of the mower. A mower of this type normally includes a towing plate 16 which is attached to the frame of the mower and extends rearwardly from the center of the frame between the rear wheels. The towing plate 16 has a hole formed in it on the longitudinal axis of the mower 10, for attachment to a device to be towed by the mower 10.

In the specific example illustrated in the drawings, the riding mower 10 is connected by a hitch 21 constructed in accordance with the present invention, to two push-type mowers 22 and 23. The two mowers 22 and 23 may be substantially identical or may be different designs, and have conventional constructions. Each of the mowers 22 and 23 includes a mower housing or frame 24 that is supported on the ground by non-swivel wheels 26 of the type that are normally provided with such mowers. In the present example, rotary mowers are illustrated and the blades are powered by gasoline engines 27. A handle 28 is attached to the frame 24 of each mower for guiding and pushing the mower while it is in use independently of the illustrated assembly.

With specific reference to FIG. 4, the front side of the mower 22 is illustrated, and a bracket 31 (which forms part of the hitch in accordance with this invention) is secured to the forward side of the housing 24 of the mower 22. In the present example, the bracket 31 is in the form of an inverted T which includes a cross member 32 (FIGS. 4 and 5) and a vertical piece 33 which is secured to the cross member 32. Holes are formed in the ends of the cross member 32 and in the housing 24, and the member 32 is secured to the front side of the housing 32 by ordinary bolts 34. The vertical piece 33 extends upwardly from the member 32, and is formed by a relatively large, heavy-duty cotter pin. The lower ends of the legs of the pin are welded to the center of the cross member 32, and the loop or eyelet of the pin is in the widened upper end 35. The other mower 23 includes a substantially identical bracket 31.

The hitch 21 further includes an attachment plate 41 which is rigidly secured to the towing plate 16 of the mower 10 by a bolt 42. The attachment plate 41 extends rearwardly from the towing plate 16, and a tow bar receptacle 43 is secured to the rearward end of the attachment plate 41. The tow bar receptacle 43 includes two vertically spaced plates 44 which are rigidly secured to the attachment plate 41 by such means as welding. A horizontal elongated tow bar 46 is positioned between the two plates 44 and fastened thereto by tow pins 47. Vertically aligned holes are formed in the two plates 44 and in the tow bar 46 and the tow pins 47 extend vertically through the holes and fasten the tow bar 46 to the attachment plate in such a manner so that the tow bar cannot pivot relative to the attachment plate and the mower.

It will be noted, particularly in FIGS. 2 and 3, that center holes 48 are also preferably formed in the two plates 44 at substantially the center of the plates. The holes 48 are useful for connecting another implement (not shown) to be towed by the tractor without removing the attachment plate 41.

As shown in the drawings, the tow bar 46 extends laterally or transversely of the longitudinal center line of the riding mower 10 and it does not pivot relative to the mower.

Adjacent each of the ends of the tow bar 46 are formed a number of fastening holes 51. The holes 51 are designed to receive a fastener such as a bolt 52 which is secured to each end of the tow bar by nuts 53 positioned on the top and bottom sides of the tow bar 46. Attached to each bolt 52 is a flexible connector such as a link chain 54 (see FIG. 5). One end of each chain 54 is secured as by welding to a bolt 52 and a selected link of the chain is attached to the vertical piece or cotter pin 33 of a mower. The links of the chain are preferably sized to slip over the widened part 35 with a slight clearance. The selected link is simply slipped over the top of the widened upper end 35 of the pin, and the widened part holds the link without the need for an additional clip. Since the chain has a number of links, the operator may select a link for attachment to a pin which best accommodates the wheel height of the lawn care implement to be towed. In addition, the bolts 52 may be adjusted up or down on the bar 46 by loosening the nuts 53.

Considering the operation of the described assembly, the attachment plate 41 may form a permanent part of the riding mower 10 or it may be attached and removed by means of the bolt 42. With the attachment plate 41 attached to the mower 10, the tow bar 46 is positioned between the two plates 44 and secured to these plates by the pins 47. The brackets 31 are normally permanently fastened to the walk-behind or push-type mowers 22 and 23, and since they are relatively small they do not interfere with the operation of the push mowers when they are used independently of the tow hitch. Assuming that the bolts 52 are already fastened to the tow bar 46, the mowers 22 and 23 are connected to the ends of the tow bar merely by slipping the selected links of the chains 54 over the tops of the cotter pins 33. The distances from the two mowers 22 and 23 to the center of the tow bar 46 is preferably adjusted so that the two mowers 22 and 23 plus the mower 13 cut a continuous swath as the riding mower 10 is driven in a substantially straight line and tows the two mowers 22 and 23 behind it. The engines 27 of the two mowers 22 and 23 are, of course, operated while the mower 10 is pulling them.

The locations of the bolts 52 at the two ends of the tow bar 46 may be adjusted in the various holes 51 in order to obtain a condition where the swaths of the two mowers 22 and 23 overlap the swath cut by the mower 13. The links of the chains 54 give the front ends of the mowers freedom of movement relative to the tow bar 46 in the event the mowers move over uneven ground.

When the tractor or riding mower 10 is driven in a straight or curved path, the two mowers 22 and 23 will follow at the sides of the mower 10 with the same conformity to overlapping obtained by mowing with the tractor 13.

The arrangement shown in FIG. 1 is particularly useful in cutting a large open area; after this has been accomplished one or both of the mowers 22 and 23 may be disconnected from the tow bar 46 merely by slipping the chains 54 from the widened parts at the upper ends of the cotter pins 33, and then the mowers 22 and 23 may be used in the normal manner to trim around bushes, flower beds, etc. The brackets 31 and the cotter pins 33, of course, do not interfere with the normal operation of the push mowers, and the handles 28 may be left intact on the mowers 22 and 23 while they are being towed. The tow bar 46 may be left on the attachment plate 41 or it may be removed for convenient storage of the riding mower 10 simply by removing the pins 47.

With the tow bar 46 and the pins 47 removed, the riding mower 10 may be used in other conventional modes of operation to tow other implements using the center holes 48 and one of the tow pins 47, or the bolt 42 may be easily removed along with the plate 41. The multiple holes 51 allow for the connection with mowers 22 and 23 of different widths, or other lawn or garden implements. It will be noted from FIGS. 1 and 2 that the center holes 48 are accessible with the tow bar 46 in place between the attachment plates 44, so that a third implement may be towed along with the two mowers 22 and 23 by connecting it using a tow pin located in the center holes 48. It will also be obvious that the arrangement shown in the drawings may be used to tow only a single push mower, such as the mower 23, connected to one end of the tow bar.

It will also be noted that a hitch in accordance with the present invention is particularly advantageous in that the major parts are bolted together. As a consequence, the hitch may be sold in kit form to users who would assemble the parts and connect them to their riding and push mowers or other implements as needed.

By towing lawn care implements on both sides of the tractor center line, a balanced operation is obtained without slippage. The attachment plate 41 is secured to the mower using only a single bolt and it may remain a permanent part of the mower, whereas the tow bar 46 may be easily and quickly removed or attached. The chain link connection between the tow bar and the mowers is self-adjusting, easily connected or disconnected, and readily adapts to implements of different heights.

The hitch may be inexpensively manufactured and sold in kit form because of the simplicity of its design and the lack of complicated mechanisms. As a consequence it may be easily assembled and it is adaptable to a number of different uses.

I claim as my invention:

1. A hitch for use with a riding lawn tractor and two or more wheeled lawn implements, the tractor having a longitudinal center line and tow means at the rear thereof, and each of the lawn implements having a housing on wheels, said hitch comprising:
- (a) a tow bar which is elongated,
- (b) attachment means secured to said tow bar at substantially the center thereof,
- (c) a removable connector for rigidly securing said attachment means to the tow means on the tractor with the tow bar extending transversely of said longitudinal center line of the tractor,
- (d) said attachment means and said connector preventing pivotal movement of said tow bar relative to said center line,
- (e) a vertically extending pin adapted to be secured to the housing of each implement, each of said pins having an enlarged upper portion, and
- (f) a flexible connector attaching said tow bar to each of said pins, each of said flexible connectors including a loop which fits around said pin and under said enlarged portion, whereby each connector is readily attachable and releasable so that the implements may be attached to or detached from the tow bar.

2. A hitch as set out in claim 1, wherein said flexible connectors are adjustably located along the length of said tow bar.

3. A hitch as set out in claim 1, wherein said flexible connectors are spaced apart and located on opposite sides of said center line.

4. A hitch as set out in claim 3 wherein the locations of said flexible connectors on said tow bar are adjustable.

5. A hitch as set out in claim 1, wherein the tractor is a riding mower and the implements are walk-behind mowers, and said flexible connectors are located on said tow bar such that the swaths cut by the walk-behind mowers overlap the swath cut by the riding mower.

6. A hitch as set out in claim 1, wherein said attachment means further includes holes on substantially said center line for use in towing an implement.

7. A hitch as set out in claim 6, wherein said holes are accessible for use while said tow bar is secured to said attachment plate.

8. A hitch as set out in claim 1, wherein each of said flexible connectors comprises a series of holes spaced along the length of said tow bar, a fastener mounted in one of said holes, and a link chain between said fastener and said pin.

9. An assembly for use on a lawn, comprising a hitch, a lawn tractor, at least two wheeled lawn implements, the tractor having a longitudinal center line and tow means at the rear thereof, each of lawn implements having a housing on wheels, said hitch comprising:
- (a) a tow bar which is elongated,
- (b) attachment means secured to said tow bar at substantially the center thereof,
- (c) a removable connector rigidly securing said attachment means to the tow means on the tractor with the tow bar extending transversely of said longitudinal center line of the tractor,
- (d) said attachment means and said connector preventing pviotal movement of said tow bar relative to said center line,
- (e) a vertically extending pin secured to the housing of each implement, each of said pins having an enlarged upper portion, and
- (f) a flexible connector attaching said tow bar to each of said pins, each of said flexible connectors including a loop which fits around said pin and under said enlarged portion, whereby each connector is readily attachable and releasable so that the implements may be attached to or detached from the tow bar.

10. A hitch kit for use with a lawn tractor and at least one wheeled lawn implement, the tractor having a longitudinal center line and tow means at the rear thereof, said lawn implement having a housing on wheels, said hitch comprising:
- (a) a tow bar which is elongated,
- (b) attachment means adapted to be secured to said tow bar at substantially the center thereof,
- (c) a removable connector for rigidly securing said attachment means to the tow means on the tractor with the tow bar extending transversely of said longitudinal center line of the tractor,
- (d) said attachment means and said connector when assembled preventing pivotal movement of said tow bar relative to said center line,
- (e) a vertically extending pin adapted to be secured to the housing of the implement said pin having an enlarged upper portion, and
- (f) a flexible connector adapted to attach said tow bar to said pin, said flexible connector including a loop which fits around said pin and under said enlarged portion, whereby said connector is readily attachable and releasable so that said pin may be attached to or detached from the tow bar.

11. A kit as set out in claim 10, wherein said tow bar has a series of spaced holes adjacent each end thereof, one of said flexible connectors being provided for each of said series of holes and adapted to be attached to a selected hole of said series, and a pin adapted to be attached to each of said flexible connectors.

12. A hitch kit as set out in claim 11, wherein said flexible connector comprises a link chain having one end thereof adapted to be attached to said tow bar, and a selected link of said chain being adapted to be looped over said enlarged portion.

* * * * *